United States Patent
Zacks et al.

(10) Patent No.: US 10,417,142 B2
(45) Date of Patent: Sep. 17, 2019

(54) OPERATING SYSTEM INTEGRATED APPLICATION ISOLATION

(71) Applicant: Red Hat Israel, Ltd., Ra'anana (IL)

(72) Inventors: Simcha Zacks, Ma'alot (IL); Oded Ramraz, Hadera (IL)

(73) Assignee: RED HAT ISRAEL, LTD., Ra'Anana (IL)

( * ) Notice: Subject to any disclaimer, the term of this patent is extended or adjusted under 35 U.S.C. 154(b) by 174 days.

(21) Appl. No.: 15/185,684

(22) Filed: Jun. 17, 2016

(65) Prior Publication Data

US 2017/0364451 A1    Dec. 21, 2017

(51) Int. Cl.
G06F 12/14 (2006.01)
G06F 3/06 (2006.01)

(52) U.S. Cl.
CPC ........ G06F 12/1425 (2013.01); G06F 3/0622 (2013.01); G06F 3/0637 (2013.01); G06F 3/0673 (2013.01); G06F 2212/1052 (2013.01)

(58) Field of Classification Search
CPC .... G06F 3/0673; G06F 3/0622; G06F 3/0637; G06F 12/1425; G06F 17/30088; G06F 2201/84; G06F 2212/1052
See application file for complete search history.

(56) References Cited

U.S. PATENT DOCUMENTS

| | | | |
|---|---|---|---|
| 6,917,963 B1 * | 7/2005 | Hipp | G06F 9/44505 709/204 |
| 7,072,916 B1 * | 7/2006 | Lewis | G06F 11/14 |
| 7,447,896 B2 | 11/2008 | Smith et al. | |
| 7,694,328 B2 | 4/2010 | Joshi et al. | |
| 8,090,797 B2 | 1/2012 | Chinta et al. | |
| 8,806,479 B2 | 8/2014 | Alpem et al. | |
| 9,098,698 B2 | 8/2015 | Ghosh et al. | |
| 2009/0248757 A1 * | 10/2009 | Havewala | G06F 16/1873 |
| 2012/0017213 A1 | 1/2012 | Hunt et al. | |

FOREIGN PATENT DOCUMENTS

CN    103914647 A    7/2014

OTHER PUBLICATIONS

Tweaking with Vishal, How to Completely Uninstall / Remove a Software Program in Windows without using 3rd Party Software?, retrieved from web archive on Jan. 6, 2019, 2011, 6 pages (Year: 2011).*

(Continued)

*Primary Examiner* — Gary W. Cygiel
(74) *Attorney, Agent, or Firm* — K&L Gates LLP

(57) ABSTRACT

A system, method, and apparatus for operating system integrated application isolation. A snapshot manager creates a snapshot table including one or more pointers to a file system storage. Then an application is installed on an operating system and mapped to a snapshot table. The snapshot manager receives a request by the application to access a memory block. The snapshot manager determines whether the application has permission to access the memory block. Responsive to a determination that the application has permission to access the memory block, the snapshot manager permits access to the memory block.

18 Claims, 5 Drawing Sheets

(56) References Cited

OTHER PUBLICATIONS

Javelin Technologies, To completely uninstall and reinstall SolidWorks, retrieved from web.archive.org on Jan. 6, 2019, 2004, 1 page (Year: 2004).*

File System Isolation for Untrusted Applications by Fareha Shafique; published 2008; Master of Applied Science Graduate Department of Electrical and Computer Engineering University of Toronto; http://www.eecg.toronto.edu/~ashvin/publications/thesis-fareha.pdf.

A Framework for Application-Level Isolation and Recovery by Shvetank Jain; published 2008; Master of Applied Science Graduate Department of Electrical and Computer Engineering University of Toronto; http://www.eecg.toronto.edu/~ashvin/publications/thesis-shvetank.pdf.

Application-Level Isolation and Recovery with Solitude by Shvetank Jain, Fareha Shafique, Madan Djeric, Ashvin Goel; published Apr. 1-4, 2008; Department of Electrical and Computer Engineering University of Toronto; http://www.eecg.toronto.edu/~ashvin/publications/solitude-eurosys.pdf.

Sandboxes: Light-Weight Application Isolation in Mobile Internet Devices by Rajesh Banginwar, Michael Leibowitz, Thomas Tanaka; published Jul. 13-17, 2009; Intel Corporation; Department of Computer Engineering San Jose State University; http://landley.net/kdocs/ols/2009/ols2009-pages-29-38.pdf.

* cited by examiner

OPERATING SYSTEM INTEGRATED APPLICATION ISOLATION

BACKGROUND

Computer systems may require various levels of memory protection for the memory used within a system. A computer system typically includes multiple applications. Each application may have access to different portions of memory of the computer system.

SUMMARY

The present disclosure provides a new and innovative system, methods and apparatus for operating system integrated application isolation.

In an example, a system includes a memory, storing a file system and file system storage, a processor, in communication with the memory, an operating system, executing on the processor, and a snapshot manager, executing on the processor. The snapshot manager creates a first snapshot table which includes one or more pointers to the file system storage. After the creation of the first snapshot table, a first application is installed on the operating system and the snapshot manager maps the first application to the first snapshot table. The snapshot manager then receives a first request, by the first application, to access a first memory block of the memory. The snapshot manager determines whether the first application has permission to access the first memory block. Responsive to a determination that the first application has permission to access the first memory block, the snapshot manager permits access to the first memory block.

Additional features and advantages of the disclosed method and apparatus are described in, and will be apparent from, the following Detailed Description and the Figures.

DETAILED DESCRIPTION OF EXAMPLE EMBODIMENTS

Currently, applications running on computer systems may interfere with one another, may not uninstall completely, and/or may introduce malware or other security risks to the computer systems. To overcome one or more of these concerns, in various example embodiments of the present disclosure, file-system level application isolation is achieved using one or more snapshot tables. For example, a snapshot manager takes a snapshot of the file system of the computer system and generates a snapshot table. The snapshot manager may then map an installed application to the snapshot table. When the application is executed, it will typically be limited to accessing memory pointed to by its corresponding snapshot table. In this manner, each application installed on the computer system may have managed and/or restricted access to the memory used by other applications and the file system. This may advantageously limit the extent to which applications can interfere with one another and may reduce the security risk posed by applications to a file system and/or an operating system. Furthermore, the present disclosure may advantageously permit multiple versions of an application to be installed onto a computer system without file system conflicts. The present disclosure also advantageously permits the complete uninstallation of files associated with an application when the application is uninstalled. For example, when an application with multiple different versions is uninstalled, the presently disclosed system may help to ensure that all files for all version are uninstalled. In various example embodiments of the present disclosure, the snapshot manager can manage and share memory access between different applications.

Figure 1:
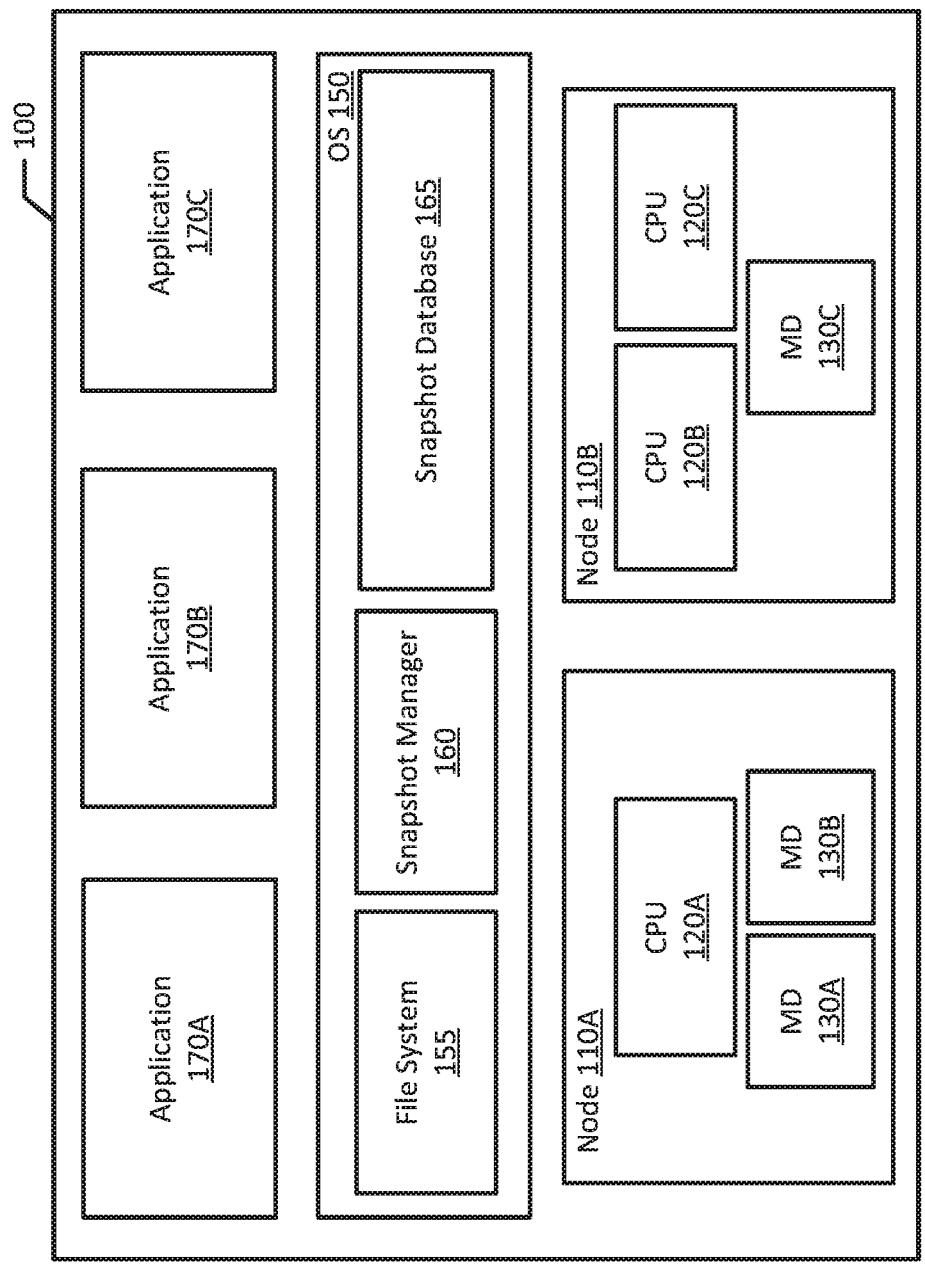
FIG. 1 is a block diagram of an example multiprocessor computer system according to an example of the present disclosure.

FIG. 1 depicts a high-level component diagram of an example multi-processor (or host) computer system 100 in accordance with one or more aspects of the present disclosure. The present disclosure relates to the issue of managing multiple applications in a computer system. The computer system 100 may include one or more interconnected nodes 110A-B. In an example, each node 110A-B may in turn include one or more physical processors (e.g., CPU 120A-C) communicatively coupled to memory devices (e.g., MD 130A-C) and input/output devices.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, an I/O device refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node 110A-B, including the connections between a processor 120A and a memory device 130A-B and between a processor 120A and an I/O device may be provided by one or more local buses of suitable architecture, for example, peripheral component interconnect (PCI).

In an example, computer system 100 may run an operating system (OS) 150 above the hardware, as schematically shown in FIG. 1. Furthermore, one or more applications 170A-C may be running on the operating system 150. As used herein, an application 170A-C may be referenced as an application program, a program, a function, a procedure, a subroutine, a routine, code, or any other commonly used equivalent.

In an example, the one or more applications 170A-C may run directly on the computer system 100 without an operating system 150 beneath it. The computer system 100 may run any type of dependent, independent, compatible, and/or incompatible applications 170A-C on the underlying hardware and OS 150. In an example, applications 170A-C executing on a computer system 100 may be dependent on the underlying hardware and/or OS 150. In another example, applications 170A-C executing on a computer system 100 may be independent of the underlying hardware and/or OS 150. For example, an application 170A executing on a computer system 100 may be dependent on the underlying hardware and/or OS 150 while other applications 170B-C executing on a computer system 100 may be independent of the underlying hardware and/or OS 150. Additionally, applications 170A-C executing on a computer system 100 may be compatible with the underlying hardware and/or OS 150. In an example, applications 170A-C executing on a computer system 100 may be incompatible with the underlying hardware and/or OS 150. For example, an application 170A executing on a computer system 100 may be compatible with the underlying hardware and/or OS 150 while other applications 170B-C executing on a computer system 100 may be incompatible with the underlying hardware and/or OS 150.

In an example, the operating system 150 includes a file system 155. Generally, a file system 155 represents a logical organization of certain data stored in memory in a format that is recognizable by the operating system 150 and applications 170A-C. A file system 155 typically includes one or more pointers to this stored data, which may be referred to herein as a file system storage 230. A file system 155 may hierarchically organize documents in directories, folders, files, and metadata that are stored in the file system storage 230 in memory (e.g., MD 130A-C). Examples of file systems include the Linux file system, Windows NT file system (NTFS), file allocation table (FAT), Unix file system (UFS), hierarchical file system (RFS), etc.

In an example of the present disclosure, the computer system 100 (and/or OS 150) includes a snapshot manager 160. In an example, the snapshot manager 160 generates and manages one or more snapshot tables 210A-C. In an example, the snapshot tables of the present disclosure are copy-on-write snapshot tables which contain pointers to an original file system storage 230 and additional pointers to updated storage. Example embodiments of snapshot tables 210A-C are described in greater detail below with respect to FIG. 2A. The one or more snapshot tables 210A-C may be stored in a snapshot database 165.

Figure 2A:
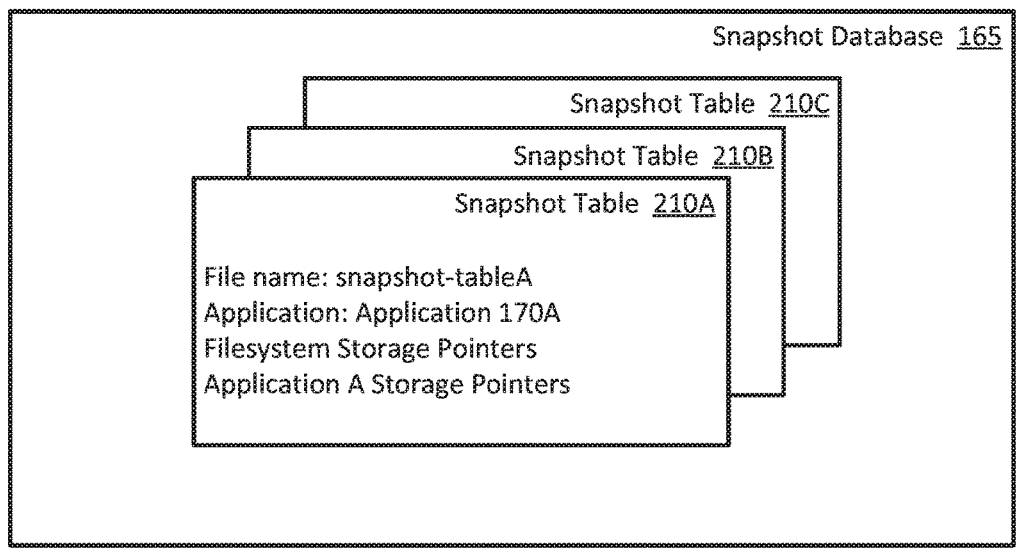
FIG. 2A is a block diagram of an example snapshot database according to an example of the present disclosure.
Figure 2B:
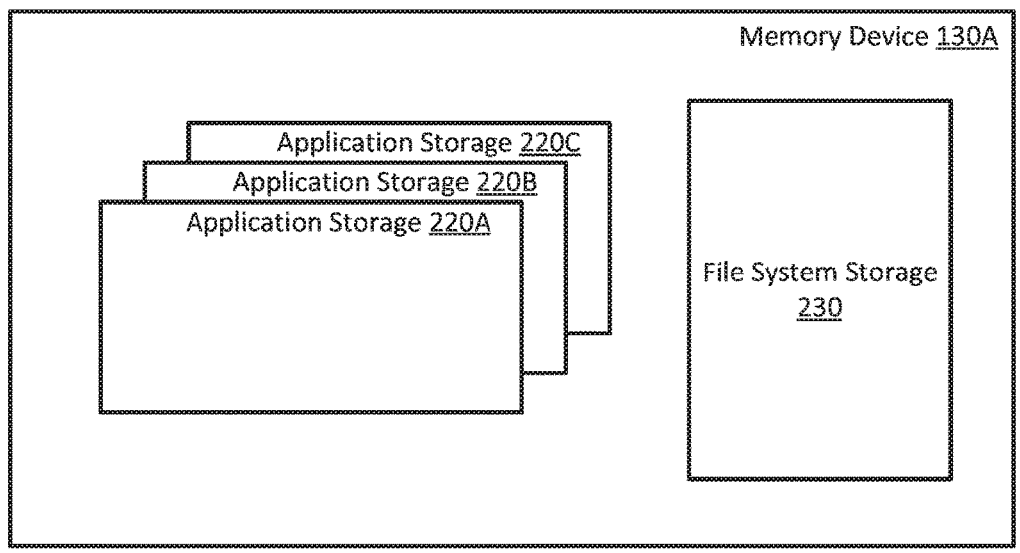
FIG. 2B is a block diagram of an example memory device according to an example of the present disclosure.

FIG. 2A illustrates an example snapshot database 165 according to an example embodiment of the present disclosure. FIG. 2B illustrates an example memory device 130A according to an example embodiment of the present disclosure. In an example, the snapshot database 165 includes one or more snapshot tables 210A-C. In an example, the snapshot database 165 may be accessed over a network or integrated as part of system 100. In the illustrated example, the snapshot tables 210A-C include metadata regarding each snapshot table 210A-C such as an alphanumeric identifier of the snapshot table file (e.g., "snapshot-tableA") and/or an alphanumeric identifier of the application 170A-C to which the snapshot table 210A-C corresponds. In an example, the each snapshot table 210A-C may additionally include one or more timestamps indicating the date and/or time when the snapshot table 210A-C was created and/or updated. In an example, each timestamp in a snapshot table 210A-C may correspond to a pointer and the time at which the pointer (and the data and/or memory it points to) was created and/or updated.

In addition, in an example, each snapshot table 210A-C may include one or more pointers to the file system storage 230. In an example, each snapshot table 210A-C may include a copy of the file system 155 (which typically includes all the pointers to the file system storage 230). In an example, each snapshot table 210A-C may include one or more pointers to the application storage 220A-C in memory (device 130A) to which the snapshot table 210A-C corresponds. For example, snapshot table 210A may include one or more pointers to the application storage 220A. In an example, application storage 220A refers to an area in memory (device 130A) that is allocated to application 170A. In an example, application storage 220A may be selectively allocated to application 170A such that other applications 170B-C cannot access application storage 220A without permission from the snapshot manager 160 (and/or the OS 150). In an example, each application storage 220A may store a variety of data corresponding to the application 170A including files, libraries, and/or routines. Although, in the illustrated example, memory is depicted with respect to a physical memory device 130A-C, it should be appreciated that as used herein, the term memory may refer to physical or virtual memory.

Figure 3:
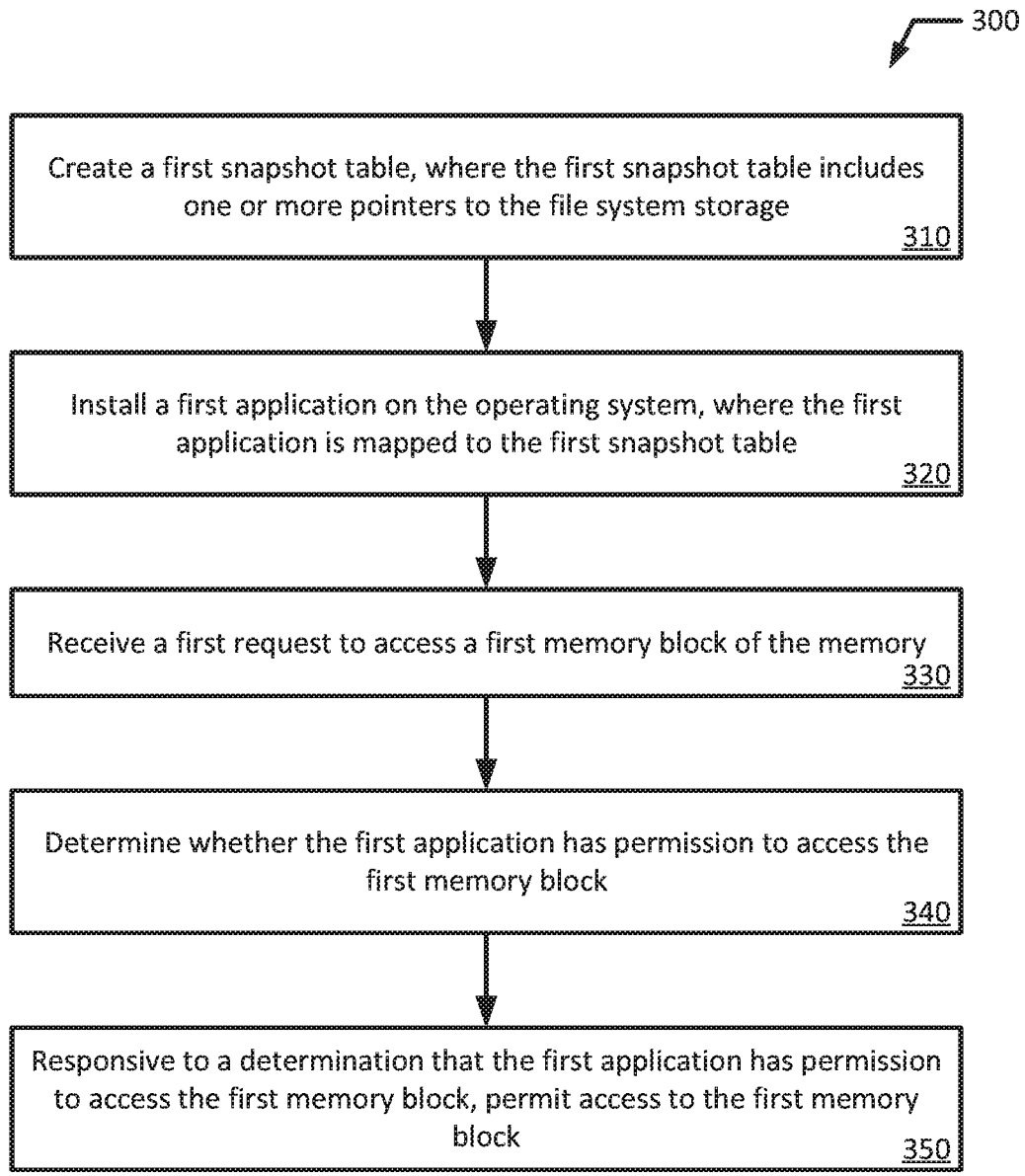
FIG. 3 is a flowchart illustrating an example process for operating system integrated application isolation according to an example of the present disclosure.

FIG. 3 illustrates a flowchart of an example method 300 for secure live virtual machine guest based snapshot recovery in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method is performed by a snapshot manager 160 and/or an OS 150.

The example method 300 starts and the snapshot manager 160 creates a first snapshot table 210A, where the first snapshot table 210A includes one or more pointers to the file system storage 230 (block 310). In an example, the first snapshot table 210A includes a copy of the file system 155. For example, the first snapshot table 210A may include a copy of the file system's 155 complete set of pointers to the file system storage 230. In an example, the first snapshot table 210A may be created responsive to receiving a request to install a first application 170A.

Subsequent to the creation of the first snapshot table 210A, a first application 170A is installed (e.g., on the OS 150) and mapped by the snapshot manager 160 to the first snapshot table 210A (block 320). For example, the file system storage 230 is stored in a first area of memory (e.g., MD 130A) and the data of the first application 170A (including, for example, the installed first application 170A itself) is stored in a second area of the memory (e.g., MD 130A) separate from the first area. For example, the first area of memory (e.g., file system storage 230) may be allocated to the file system 155 for use and storage of file system 155 data and the second area of memory (e.g., first application storage 220A) may be allocated to the first application 170A for use and storage of the first application 170A data. In an example, the first application 170A (and other applications 170B-C) may be restricted from accessing and/or modifying the file system storage 230 without permission from the snapshot manager 160 (and/or the OS 150). In an example, the first application 170A, the snapshot manager 160, and/or the OS 150 may have access to the first application storage 220A while other applications 170B-C may be restricted from accessing and/or modifying the first application storage 220A without permission from the snapshot manager 160 (and/or the OS 150).

In an example, mapping the first application 170A to the first snapshot table 210A includes updating the first snapshot table 210A to include a first pointer to the storage location of the first application 170A in the memory. For example, the first application 170A may be installed in first application storage 220A and then the first snapshot table 210A may be updated to include at least a first pointer to the first application storage 220A where the first application 170A has been installed.

In an example, the snapshot manager 160 may create one or more additional snapshot tables 220B-C and map one or more applications 170B-C to each snapshot table 220B-C. In this manner, each application 170A-C that is installed may typically perceive itself to be the only application 170A-C in the computer system 100 from its own perspective (unless the snapshot manager 160 provides the application 170A-C with access to the memory of another application in the application storage 220A-C).

The snapshot manager 160 may then receive a first request by the first application 170A to access a first memory block of the memory (e.g., MD 170A) (block 330). In an example, a block of memory may be virtual memory or physical memory. In an example, a block of memory may be of a variety of different sizes. For example, a block of memory may refer to multiple segments of that may be contiguous or may be dispersed across different areas of physical and/or virtual memory.

In an example, the snapshot manager 160 may intercept the first request by the first application 170A to access the first memory block of the memory (e.g., MD 170A). In an example, the first request to access the first memory block may be a request to read data in the first memory block. In an example, the first request to access the first memory block may be a request to execute data in the first memory block. In an example, the first request to access the first memory block may be a request to write data to the first memory block (e.g., write new data or modify data). In an example, the first request to access the first memory block may be a request to delete data from the first memory block.

In an example, the first memory block of the memory (e.g., MD 170A) may be allocated to (and/or pointed to by) the file system 155 and part of the file system storage 230, allocated to (and/or pointed to by) the first application 170A and part of the first application storage 220A, or allocated to (and/or pointed to by) a second application 170B-C and part of a second application storage 220B-C.

The snapshot manager 160 may then determine whether the first application 170A has permission to access the first memory block (block 340). In an example, the snapshot manager 160 may maintain metadata regarding whether and/or how much access is permitted for each snapshot table 210A-C and application storage 220A-C to which each snapshot table 210A-C corresponds. For example, the snapshot manager 160 may include metadata that indicates that application 170A has unlimited access (e.g., both read and write access) permissions to application storage 220A, metadata that indicates that application 170B has no access permissions to application storage 220A, and metadata that indicates that application 170C has only read access permissions to application storage 220A.

In an example, determining, by the snapshot manager 160, whether the first application 170A has permission to access the first memory block includes determining whether the first memory block has been allocated to the first application 170A. In an example, determining, by the snapshot manager 160, whether the first application 170A has permission to access the first memory block includes checking metadata corresponding to the first memory block to determine whether and what kind of access rights the first application 170A has to the first memory block. Also, other techniques may be used by the snapshot manager 160 to determine whether the first application 170A has permission to access the first memory block. For example, flags may be used such that if the first application 170A attempts to access memory (e.g., MD 130A) that it does not have permissions to access or if the first application 170A attempts to access memory (e.g., MD 130A) in a manner that is not permitted (e.g., if application 170A attempts to write to read-only memory), the flag may be triggered.

In an example, responsive to a determination that the first application 170A has permission to access the first memory block in the manner requested, the snapshot manager 160 permits the requested access to the first memory block (block 350). For example, if application 170A requests to write to the first memory block, and the snapshot manager 160 determines that application 170A has write access to the first memory block, the snapshot manager 160 will permit application 170A's write access to the first memory block. In an example, if the snapshot manager 160 determines that first memory block has been allocated to the first application 170A, it will determine that first application 170A has permission to access the first memory block.

In an example, if the snapshot manager 160 determines that first memory block has been allocated to a second application (e.g., application 170B-C), it will determine whether the first memory block has been shared with the first application 170A. Responsive to determining that the first memory block allocated to a second application (e.g., application 170B-C) that has been shared with the first application 170A, the snapshot manager 160 will permit the first application 170A's requested access to the first memory block. In an example, the snapshot manager 160 will permit the first application 170A's requested access to the first memory block allocated to the second application (e.g., application 170B-C) via an application program interface (API) of the snapshot manager 160. In an example, responsive to determining that first memory block allocated to the second application (e.g., application 170B-C) has not been shared with the first application 170A, the snapshot manager 160 will determine whether the first memory block allocated to the second application (e.g., application 170B-C) should be shared with the first application 170A. For example, a user or developer may determine that a second application B storage 220B should always be shared with application 170A. In an example, the user or developer may request that the second application B storage 220B be shared with application 170A. In an example, the application 170A may request that the second application B storage 220B be shared with application 170A. For example, a web browser application 170A may wish to access the memory of an document reading application B 170B. In another example, a document reading application 170A may wish to access a printer driver application B 170B.

In an example, responsive to determining that the first memory block allocated to the second application (e.g., application 170B-C) should not be shared with the first application 170A, the snapshot manager 160 denies the first application 170A's first request to access the first memory block.

In an example, if the snapshot manager 160 determines that first memory block has been allocated to the file system 155, it may then determine whether the first memory block has been shared with the first application 170A. Responsive to determining that the first memory block allocated to the file system 155 has been shared with the first application 170A, the snapshot manager 160 will permit the first application 170A's requested access to the first memory block. In an example, the snapshot manager 160 will permit the first application 170A's requested access to the first memory block allocated to the file system 155 via an application program interface (API) of the snapshot manager 160. In an example, responsive to determining that first memory block allocated to the file system 155 has not been shared with the first application 170A, the snapshot manager 160 will determine whether the first memory block allocated to the file system 155 should be shared with the first application 170A. For example, a user or developer may determine that a file system storage 230 should always be shared with application 170A. In an example, the user or developer may request that the file system storage 230 be shared with application 170A. In an example, the application 170A may request that the file system storage 230 be shared with application 170A.

In an example, responsive to determining that the first memory block allocated to the file system 155 should not be shared with the first application 170A, the snapshot manager 160 denies the first application 170A's first request to access the first memory block.

In an example, responsive to permitting access by the first application 170A to the first memory block, the snapshot manager 160 determines the type of access by the first application 170A to the first memory block. For example, responsive to permitting access by the first application 170A to the first memory block, the snapshot manager 160 may determine whether the first application 170A's access to the first memory block requires a write operation or a read operation (or both).

In an example, responsive to determining that the first application 170A's access to the first memory block includes writing to the first memory block, the snapshot manager 160 updates the snapshot table 210A corresponding to the application 170A to include and/or update a pointer to the first memory block. For example, if a pointer to the first memory block already exists in the snapshot table 210A corresponding to the application 170A, the snapshot manager 160 will update the pointer to the first memory block in the snapshot table 210A in response to a write operation on the first memory block. In another example, if a pointer to the first memory block does not exist in the snapshot table 210A corresponding to the application 170A, the snapshot manager 160 will create a pointer to the first memory block in the snapshot table 210A in response to a write operation on the first memory block.

In an example, responsive to receiving a request to modify more than one application 170A-B with first data, the snapshot manager 160 may save the first data in a second memory block and update the snapshot tables 210A-B corresponding to the applications 170A-B to each include a pointer to the second memory block. In this manner, an OS 150 level change, such as a security patch, may be installed on multiple applications 170A-B without having to save the same first data (e.g., the security patch) for each application 170A-B for which the OS 150 level change is made. For example, rather than separately storing the security patch for two separate applications 170A-B, the security patch may be advantageously stored once using the snapshot manager 160 of the present disclosure.

In an example, the snapshot manager 160 (and/or OS 150) is configured to uninstall one or more applications 170A-C and delete the one or more snapshot tables 210A-C corresponding to the one or more applications 170A-C. For example, responsive to a request (e.g., by a user and/or the OS 150) to uninstall (or delete) the first application 170A, the snapshot manager 160 (and/or OS 150) may cause the first application 170A to be uninstalled and delete the first snapshot table 210A.

Figure 4:
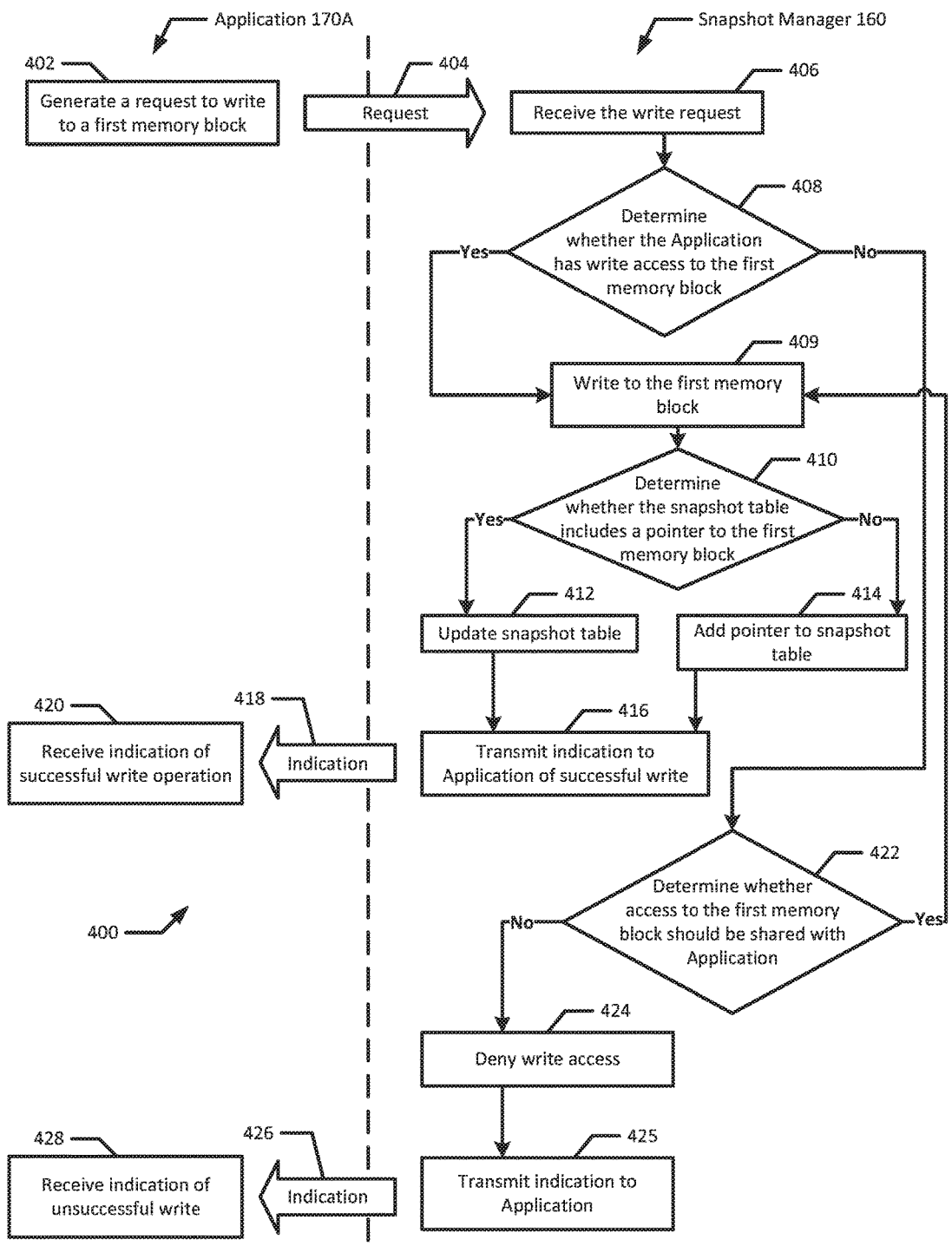
FIG. 4 is a flow diagram illustrating an example process for operating system integrated application isolation according to an example of the present disclosure.

FIG. 4 illustrates a flow diagram of an example method 400 for operating system integrated application isolation in accordance with an example of the present disclosure. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

In an example, an application 170A generates a request to write to a first block of memory (e.g., in MD 130A) (block 402). The application 170A transmits the request to the snapshot manager 160 (block 404). The snapshot manager 160 receives the write request (block 406). The snapshot manager 160 then determines whether the application 170A has write access to the first memory block (block 408). Responsive to determining that the application 170A has write access to the first memory block, the snapshot manager 160 permits writing (by the application 170A, OS 150, and/or other driver software) to the first memory block (block 409). The snapshot manager 160 then determines whether the snapshot table 210A (which contains pointers to the application storage 220A and/or corresponds to application 170A) includes a pointer to the first memory block (block 410). Responsive to determining that the snapshot table 210A includes a pointer to the first memory block, the snapshot manager 160 updates the existing pointer to the first memory block in the snapshot table 210A (block 412). Responsive to determining that the snapshot table 210A does not include a pointer to the first memory block, the snapshot manager 160 adds a new pointer to the first memory block in the snapshot table 210A (block 414). Then the snapshot manager 160 transmits an indication to the application 170A that the write operation was successful (blocks 416 and 418). The application 170A receives the indication of the successful write operation (block 420).

In an example, responsive to determining that the application 170A does not have write access to the first memory block, the snapshot manager 160 determines whether access to the first memory block should be shared with the application 170A (block 422). Responsive to determining that access to the first memory block should be shared with the application 170A, the snapshot manager 160 permits writing (by the application 170A, OS 150, and/or other driver software) to the first memory block (block 409). The snapshot manager 160 then determines whether the snapshot table 210A (which contains pointers to the application storage 220A and/or corresponds to application 170A) includes a pointer to the first memory block (block 410). Responsive to determining that the snapshot table 210A includes a pointer to the first memory block, the snapshot manager 160 updates the existing pointer to the first memory block in the snapshot table 210A (block 412). Responsive to determining that the snapshot table 210A does not include a pointer to the first memory block, the snapshot manager 160 adds a new pointer to the first memory block in the snapshot table 210A (block 414). Then the snapshot manager 160 transmits an indication to the application 170A that the write operation was successful (blocks 416 and 418). The application 170A receives the indication of the successful write operation (block 420).

Responsive to determining that access to the first memory block should not be shared with the application 170A, the snapshot manager 160 denies write access to the application 170A (block 424). Then the snapshot manager 160 transmits an indication to the application 170A that its access request has been denied (blocks 425 and 426). The application 170A then receives the indication of the unsuccessful write attempt (block 428). Although the example illustrated in FIG. 4 is described in regards to a write request, it should be appreciated that steps described in FIG. 4 may be applied to other access requests by an application such as read requests, execution requests, etc.

Figure 5:
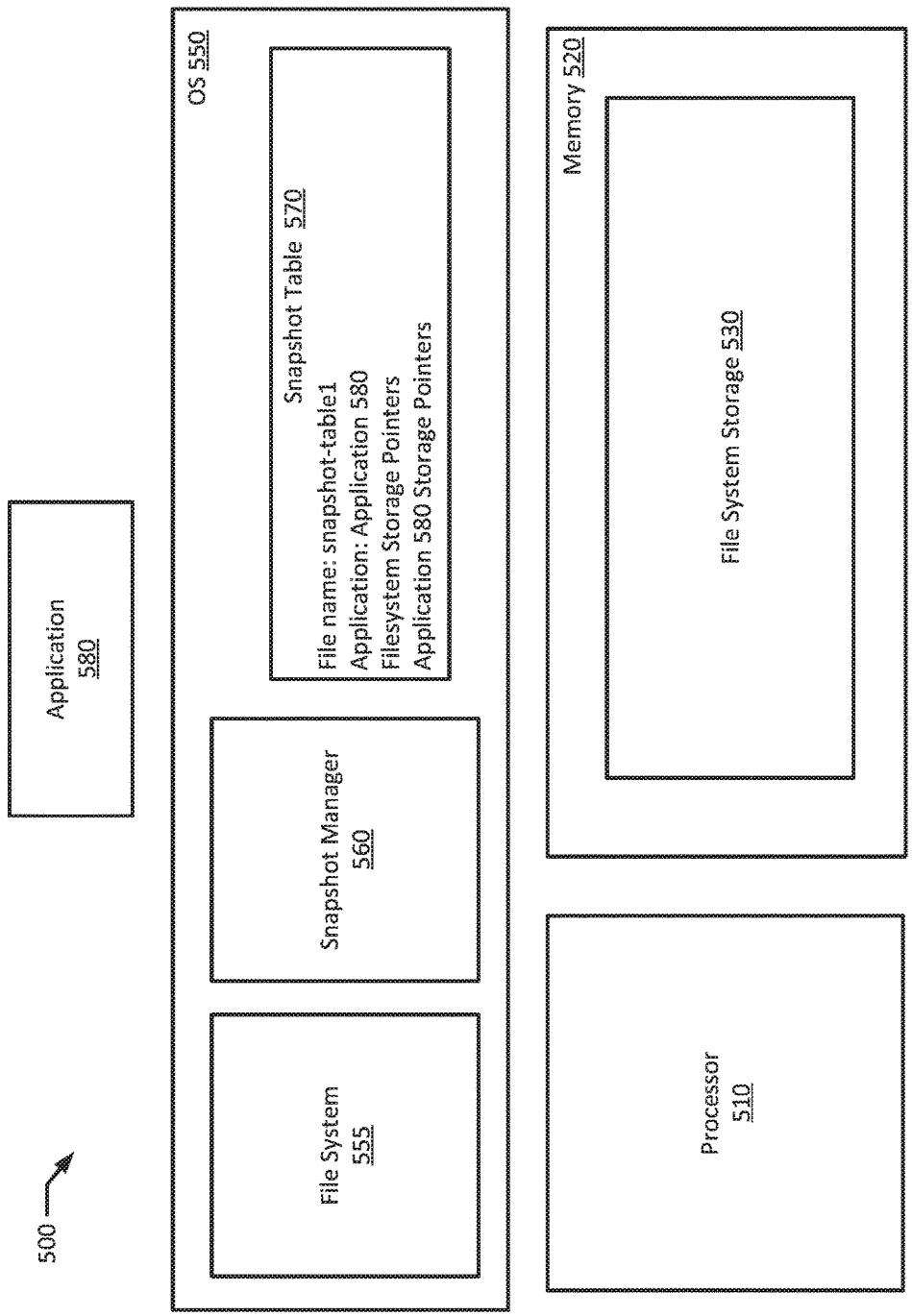
FIG. 5 is a block diagram of an example multiprocessor computer system according to an example of the present disclosure.

FIG. 5 depicts a high-level component diagram of an example computer system 500 in accordance with one or more example aspects of the present disclosure. The computer system 500 may include a memory 520 and a processor 510 in communication with the memory 520. The memory 520 may include a file system storage 530. The computer system 500 may further include an operating system 550 configured to execute on the processor 510. The operating system 550 may include a file system 555, a snapshot manager 560, and reference a snapshot table 570. The snapshot manager 560 may create a snapshot table 570 which includes one or more pointers to the file system storage 530. After the creation of the snapshot table 570, an application 580 may be installed on the operating system 550 and the snapshot manager 560 may map the application 580 to the snapshot table 570. The snapshot manager 560 may then receive a first request, by the application 580, to access a first memory block of the memory 520. The snapshot manager 560 may determine whether the application 580 has permission to access the first memory block. Responsive to a determination that the application 580 has permission to access the first memory block, the snapshot manager 560 may permit access to the first memory block.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory, including a file system storage;
a processor, in communication with the memory;
an operating system, executing on the processor, including a file system; and
a snapshot manager, executing on the processor, wherein the processor:
creates, by the snapshot manager, a first snapshot table, wherein the first snapshot table includes a copy of the file system, the copy of the file system including pointers to the file system storage;
subsequent to the creation of the first snapshot table, installs a first application on the operating system, the first application including a first file and a second file, wherein the first application is mapped, by the snapshot manager, to the first snapshot table;
receives, by the snapshot manager, a first request, by the first application, to access a first memory block of the memory;
determines, by the snapshot manager, whether the first application has permission to access the first memory block;
responsive to a determination that the first application has permission to access the first memory block, permits, by the snapshot manager, access to the first memory block;
installs a different version of the first application on the operating system such that a plurality of versions of the first application are installed, the different version of the first application including different respective versions of the first file and the second file, wherein the different version of the first application is mapped, by the snapshot manager, to a second snapshot table; and
uninstalls all files included in the first application, including deleting, by the snapshot manager, the first snapshot table and the second snapshot table, such that each of the different respective versions of the first file and the second file for each of the different versions of the first application are uninstalled.

2. The system of claim 1, wherein the file system is stored in a first area of the memory and data of the first application is stored in a second area of the memory separate from the first area.

3. The system of claim 1, wherein mapping, by the snapshot manager, the first application to the first snapshot table includes updating the first snapshot table to include a first pointer to the storage location of the first application in the memory.

4. The system of claim 1, wherein determining, by the snapshot manager, whether the first application has permission to access the first memory block includes determining whether the first memory block has been allocated to the first application.

5. The system of claim 1, wherein the snapshot manager further determines whether the first application's access to the first memory block requires a write operation.

6. The system of claim 1, wherein responsive to a determination that the first application does not have permission to access the first memory block because the first memory block has been allocated to a second application, the processor further determines, whether the first memory block allocated to the second application should be shared with the first application.

7. The system of claim 6, wherein responsive to determining that the first memory block should be shared with the first application, the processor further permits, by the snapshot manager, access to the first memory block via an application program interface of the snapshot manager.

8. A method comprising:
creating, by a snapshot manager executing on a processor, a first snapshot table, wherein the first snapshot table includes a copy of the file system, the copy of the file system including one or more pointers to the file system storage;
subsequent to the creation of the first snapshot table, installing a first application on an operating system executing on the processor, the first application including a first file and a second file, wherein the first application is mapped, by the snapshot manager, to the first snapshot table;
receiving, by the snapshot manager, a first request, by the first application, to access a first memory block of the memory;
determining, by the snapshot manager, whether the first application has permission to access the first memory block;
responsive to a determination that the first application has permission to access the first memory block, permitting, by the snapshot manager, access to the first memory blocks;
installing a different version of the first application on the operating system such that a plurality of versions of the first application are installed, the different version of the first application including different respective versions of the first file and the second file, wherein the different version of the first application is mapped, by the snapshot manager, to a second snapshot table; and
uninstalling all files included in the first application, including deleting, by the snapshot manager, the first snapshot table and the second snapshot table, such that each of the different respective versions of the first file and the second file for each of the different versions of the first application are uninstalled.

9. The method of claim 8, wherein the file system is stored in a first area of the memory and data of the first application is stored in a second area of the memory separate from the first area.

10. The method of claim 8, wherein mapping the first application to the first snapshot table includes updating the first snapshot table to include a first pointer to the storage location of the first application in the memory.

11. The method of claim 8, wherein determining whether the first application has permission to access the first memory block includes determining whether the first memory block has been allocated to the first application.

12. The method of claim 8, further comprising determining, by the snapshot manager, whether the first application's access to the first memory block requires a write operation.

13. The method of claim 8, further comprising responsive to a determination that the first application does not have permission to access the first memory block because the first memory block has been allocated to a second application, determining, whether the first memory block allocated to the second application should be shared with the first application.

14. The method of claim 13, further comprising responsive to determining that the first memory block should be shared with the first application, permitting, by the snapshot manager, access to the first memory block via an application program interface of the snapshot manager.

15. A computer-readable non-transitory storage medium comprising executable instructions that, when executed by a computer system, cause the computer system to:
create, by a snapshot manager executing on the computer system, a first snapshot table, wherein the first snapshot table includes a copy of the file system, the copy of the file system including one or more pointers to the file system storage;
subsequent to the creation of the first snapshot table, installing a first application on an operating system executing on the computer system, the first application including a first file and a second file, wherein the first application is mapped, by the snapshot manager, to the first snapshot table;
receiving, by the snapshot manager, a first request, by the first application, to access a first memory block of the memory;
determining, by the snapshot manager, whether the first application has permission to access the first memory block;
responsive to a determination that the first application has permission to access the first memory block, permitting, by the snapshot manager, access to the first memory block;
installing a different version of the first application on the operating system such that a plurality of versions of the first application are installed, the different version of the first application including different respective versions of the first file and the second file, wherein the different version of the first application is mapped, by the snapshot manager, to a second snapshot table; and
uninstalling all files included in the first application, including deleting, by the snapshot manager, the first snapshot table and the second snapshot table, such that each of the different respective versions of the first file and the second file for each of the different versions of the first application are uninstalled.

16. The computer-readable non-transitory storage medium of claim 15, wherein the file system is stored in a first area of the memory and data of the first application is stored in a second area of the memory separate from the first area.

17. The computer-readable non-transitory storage medium of claim 15, wherein mapping the first application to the first snapshot table includes updating the first snapshot table to include a first pointer to the storage location of the first application in the memory.

18. The computer-readable non-transitory storage medium of claim 15, wherein determining whether the first application has permission to access the first memory block includes determining whether the first memory block has been allocated to the first application.

* * * * *